(12) United States Patent
Chen

(10) Patent No.: US 7,164,919 B2
(45) Date of Patent: Jan. 16, 2007

(54) SCHEDULING OF DATA TRANSMISSION FOR TERMINALS WITH VARIABLE SCHEDULING DELAYS

(75) Inventor: Tao Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 427 days.

(21) Appl. No.: 10/188,169

(22) Filed: Jul. 1, 2002

(65) Prior Publication Data
US 2004/0002341 A1  Jan. 1, 2004

(51) Int. Cl.
*H04Q 7/20* (2006.01)
(52) U.S. Cl. .................. 455/452.2; 370/230
(58) Field of Classification Search ........... 455/453, 455/452.1, 450, 442, 435.3, 452.2; 370/230, 370/235, 238
See application file for complete search history.

(56) References Cited

U.S. PATENT DOCUMENTS 6,064,659 A * 5/2000 Rohani et al. ............. 370/318
6,651,125 B1 * 11/2003 Maergner et al. .......... 710/244
6,745,044 B1 * 6/2004 Holtzman et al. .......... 455/522

FOREIGN PATENT DOCUMENTS

WO 01/63851 A1 8/2001
WO 01/78441 A1 10/2001

OTHER PUBLICATIONS

WO 98/35514, Tiedemann et al. Method and Apparatus for Forward Link Rate Scheduling, PCT/US98/02626.*

* cited by examiner

*Primary Examiner*—Lee Nguyen
(74) *Attorney, Agent, or Firm*—Philip Wadsworth; Thien Nguyen; Rupit Patel

(57) ABSTRACT

Techniques for scheduling terminals with different scheduling delays. Initially, the scheduling delay of each terminal is determined, and the total available transmit power and the link efficiency of each terminal are estimated. In a first scheme, the terminals are scheduled for data transmission based on the longest scheduling delay among the delays of all terminals. In a second scheme, each terminal is assigned a particular priority based on its scheduling delay, and the terminals are scheduled based on their assigned priorities. In a third scheme, the terminals are categorized into classes based on their scheduling delays. A percentage of the total available transmit power is allocated to each class, and the terminals in each class are scheduled based on the transmit power allocated to that class. In a fourth scheme, the terminals are scheduled for data transmission, and the schedule for each terminal is applied after its scheduling delay.

37 Claims, 6 Drawing Sheets

SCHEDULING OF DATA TRANSMISSION FOR TERMINALS WITH VARIABLE SCHEDULING DELAYS

BACKGROUND

1. Field

The present invention relates generally to data communication, and more specifically to techniques for scheduling data transmission to terminals with variable scheduling delays.

2. Background

Wireless communication systems are widely deployed to provide various types of communication such as voice, data, and so on. These systems may be multiple-access systems capable of supporting communication with multiple users, and may be based on code division multiple access (CDMA), time division multiple access (TDMA), frequency division multiple access (FDMA), or some other multiple access techniques. CDMA systems may provide certain advantages over other types of system, including increased system capacity.

Many CDMA systems are capable of supporting different types of services (e.g., voice, packet data, and so on) on the forward and reverse links. Each type of service is normally characterized by a particular set of requirements. For example, voice service typically requires a fixed and common grade of service (GOS) for all users as well as a relatively stringent and fixed delay. In particular, the overall one-way delay of speech frames may be specified to be less than 100 msec. These requirements may be satisfied by providing a fixed and guaranteed data rate for each user (e.g., via a dedicated traffic or code channel assigned to the user for the duration of a communication session) and ensuring a particular maximum error rate for speech frames independent of the link resources. To maintain the required error rate at a given data rate, a higher allocation of resources is required for a user having a degraded link.

In contrast, packet data service may be able to tolerate different GOS for different users and may further be able to tolerate variable amounts of delays. The GOS of the packet data service may be defined as the total delay incurred in the transfer of a data message. This delay can be a parameter used to optimize the efficiency of a data communication system.

In a wireless communication system, the total transmit power available at any given base station is typically fixed. For a multiple-access communication system, the total transmit power may be allocated and used to transmit data to a number of terminals concurrently. At any given moment, multiple terminals having different requirements may desire data transmission. To support both types of service (i.e., voice and packet data), a CDMA system can be designed and operated to first allocate transmit power to voice users requiring a particular GOS and shorter delays. Any remaining transmit power can then be allocated to packet data users whom can generally tolerate longer delays.

A key goal of a wireless communication system is then to schedule the data transmission for packet data users such that high system performance is attained. Numerous challenges are encountered in scheduling data transmission to the terminals for these packet data users. First, the amount of transmit power required by voice users can change from frame to frame, which would then correspondingly affect the amount of transmit power available for packet data users. Second, the transmit power required by each scheduled terminal for a given data rate is dependent on the channel conditions and can also vary over time. Third, the terminals to be scheduled may have different scheduling delays (which may be defined, for example, as the difference between the time a terminal is scheduled and the time of actual data transmission). For example, some terminals may be in soft handoff and are supported by multiple base stations, and the scheduling delays of these terminals may be longer than those of terminals not in soft handoff.

There is therefore a need in the art for techniques to schedule data transmission to terminals with different scheduling delays.

SUMMARY

Techniques are provided herein to schedule terminals with different scheduling delays, which may arise due to various factors such as soft handoff, communication with different network elements, different back-haul delays, and so on. The total transmit power, $P_{tot}$, available at a given base station may be initially allocated to terminals that are not scheduled (e.g., voice and fixed data rate terminals). The remaining transmit power, $P_{sched}$, may then be used for scheduled terminals. Terminals associated with different scheduling delays may be scheduled based on various scheduling schemes.

In a first scheme, the scheduling delay of each terminal to be scheduled for data transmission is initially determined. The terminals are then scheduled for data transmission based on the longest scheduling delay among the delays of all terminals and in accordance with a particular scheduling scheme. To perform the scheduling, the total transmit power available for data transmission to the terminals (at the time of actual data transmission) may be estimated or predicted, and the link efficiency of each terminal may also be estimated. The terminals are then scheduled based on their estimated link efficiencies and the estimated total available transmit power. A higher margin may be used in scheduling the terminals because of the use of the longest scheduling delay. The particular scheduling scheme may consider various factors in scheduling the terminals such as, for example, the link efficiencies of the terminals, the quality of service (QOS) to be provided, the service types, the amount and type of data to be transmitted, revenue and profits considerations, and so on.

In a second scheme, the scheduling delay of each terminal to be scheduled for data transmission is initially determined. Each terminal is then assigned a particular priority based on its scheduling delay. In general, terminals with longer scheduling delays may be assigned higher priority than terminals with shorter scheduling delays. The terminals are then scheduled for data transmission based on their assigned priorities and in accordance with a particular scheduling scheme.

In a third scheme, the scheduling delay of each terminal to be scheduled for data transmission is initially determined. The terminals are then categorized into a number of classes based on their scheduling delays. A particular percentage of the total system capacity (e.g., a percentage of the total available transmit power) is allocated to each class. The terminals in each class are then scheduled for data transmission based on the system capacity allocated to that class and in accordance with a particular scheduling scheme. The percentage allocated to each class may be dependent on various factors, and may also be dynamically adjusted based on the operating conditions and system requirements.

In a fourth scheme, the scheduling delay of each terminal to be scheduled for data transmission is initially determined.

The terminals are then scheduled for data transmission in accordance with a particular scheduling scheme to provide an individual schedule for each terminal. The schedule for each terminal is then applied at a future transmission interval determined based on its scheduling delay.

Various aspects and embodiments of the invention are described in further detail below. The invention further provides methods, program codes, digital signal processors, schedulers, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
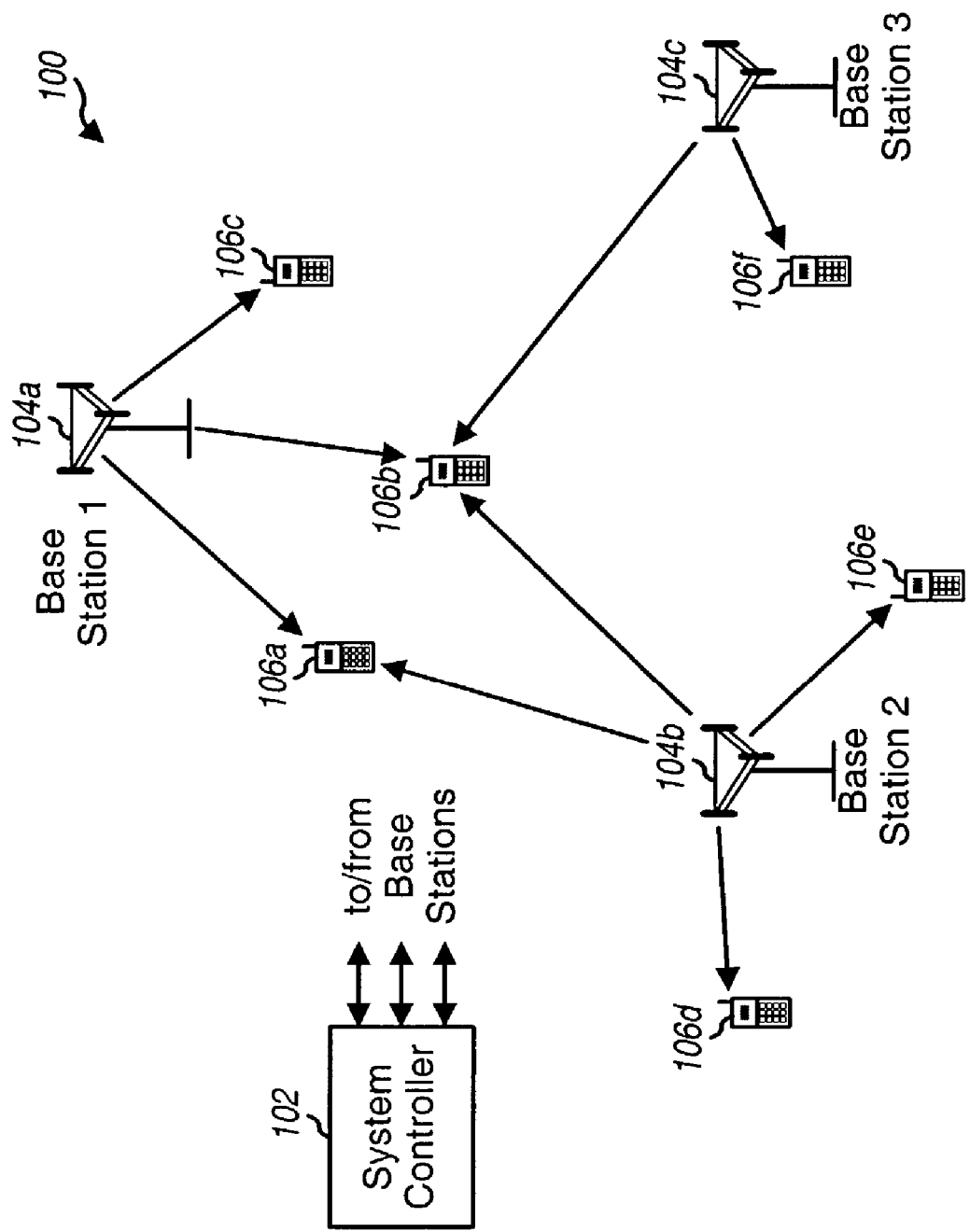
FIG. 1 is a diagram of a wireless multiple-access communication system that supports a number of users.

FIG. 1 is a diagram of a wireless multiple-access communication system 100 that supports a number of users. System 100 may be designed to implement one or more CDMA standards, such as IS-95, cdma2000, IS-856, W-CDMA, and other standards, which are known in the art and incorporated herein by reference. System 100 includes a number of base stations 104 that provide coverage for their respective geographic regions. A base station may also be referred to as a base transceiver system (BTS), an access point, a UTRAN, or some other terminology. The base station and/or its coverage area are also often referred to as a cell. Base stations 104 couple to a system controller 102 that provides coordination and control for the base stations coupled to it. System controller 102 may be a base station controller (BSC), a mobile switching center (MSC), or some other network entity.

As shown in FIG. 1, various terminals 106 are dispersed throughout the system. In an embodiment, each terminal 106 may communicate with one or more base stations 104 on the forward link and/or reverse link at any given moment, depending on whether or not the terminal is active and whether or not it is in an area with adequate link signal quality from multiple base stations. The forward link (or downlink) refers to transmission from the base station to the terminal, and the reverse link (or uplink) refers to transmission from the terminal to the base station.

In FIG. 1, base station 104a transmits user-specific data to terminals 106a, 106b, and 106c on the forward link, base station 104b transmits user-specific data to terminals 106a, 106b, 106d, and 106e, and base station 104c transmits user-specific data to terminals 106b and 106f. Each of these user-specific transmissions may be for voice, packet data, or both. Other terminals in the system may receive pilots and common/dedicated signaling, but no user-specific data transmissions, from the base stations. For simplicity, these terminals are not shown in FIG. 1. Terminals 106a and 106b are in overlapping coverage of multiple base stations, and each of these terminals concurrently receives user-specific data transmissions from multiple base stations while in soft handoff. The reverse link communication is not shown in FIG. 1 for simplicity.

As noted above, system 100 may be designed to provide various types of services such as voice, packet data, and so on. Typically, only certain types of services are scheduled while other types of services are not scheduled. For example, voice users are typically not scheduled due to their delay constraints and limited data rate. Conversely, packet data users generally do not have short delay constraints and can tolerate more variations in receiving their data, and are thus good candidates for scheduling.

In an embodiment, voice users and fixed-rate (e.g., circuit-switched) data users are not scheduled. The transmit power usage for these users may be determined based on autonomous feedback from the terminals. Packet data users can have their data rates and duration scheduled by a scheduler using various schemes described below.

The total transmit power, $P_{tot}$, available at a given base station may be used to transmit data to both unscheduled and scheduled users. At each scheduling interval, the total amount of transmit power, $P_{unsched}$, required to support unscheduled users may be determined and allocated to these users. The remaining transmit power, $P_{sched}$ (where $P_{sched} = P_{tot} - P_{unsched}$), may then be allocated to scheduled users based on the techniques described below.

Figure 2:
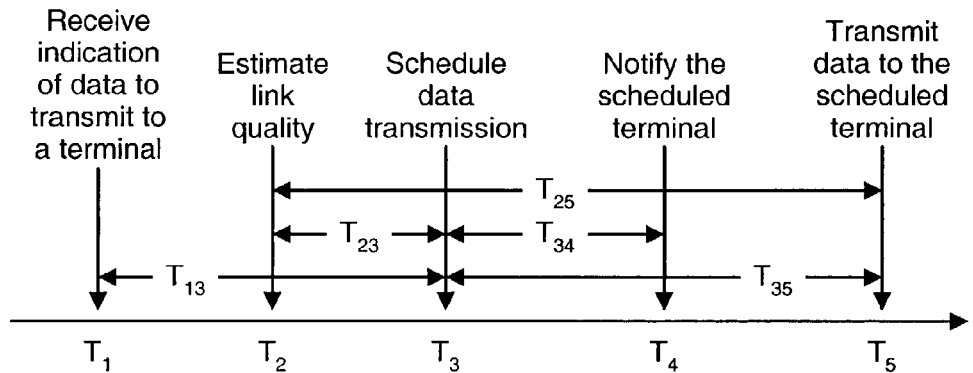
FIG. 2 is a diagram illustrating a timeline for scheduling and transmitting data to a particular terminal.

FIG. 2 is a diagram illustrating a timeline for scheduling and transmitting data to a particular terminal. At time $T_1$, an indication is received (e.g., by the scheduler) that there is data to be transmitted to the terminal. At time $T_2$, the link for the terminal is estimated. This link estimate may be made in response to receiving the indication of impending data for the terminal. Alternatively, the link estimate may be made at regular intervals for the terminal. Other information needed to schedule the terminal for data transmission is also determined. For example, the amount of transmit power expected to be available at the time of the data transmission (at time $T_5$) may be estimated or predicted.

At time $T_3$, the data transmission for this terminal is scheduled along with other data transmissions for other terminals. If the terminal is scheduled to receive a data transmission, then a notification is sent to the terminal at time $T_4$ to allow the terminal to prepare for the data transmission. The notification may be sent in accordance with the particular standard being implemented. For example, the notification may be provided via a message transmitted from the base station to the terminal (e.g., a Supplemental Channel Assignment Message (SCAM) in cdma2000). At time $T_5$, the data transmission to the terminal commences.

The scheduling may be performed at each "scheduling" interval, and terminals are typically scheduled for data transmission in one or more future "transmission" intervals. In an embodiment, the scheduling interval and transmission interval are both given in units of "frame", which may be 20 msec for some CDMA systems. However, other scheduling and transmission intervals may also be used, and this is within the scope of the invention. For simplicity, the following description assumes that scheduling and data transmission are both performed at each frame. At any given frame, (1) scheduling is performed and terminals are scheduled for data transmission in one or more future frames, and (2) data is transmitted to terminals scheduled for data transmission in the current frame based on a schedule determined in a prior frame.

As shown in FIG. 2, each terminal may be associated with (1) a particular time $T_{13}$ between the time of the data indication to the time of scheduling, (2) a particular time $T_{25}$ between the time of the link estimate to the time of data transmission, (3) a particular time $T_{34}$ between the time of scheduling to the time of notification, and (4) a particular time $T_{35}$ between the time of scheduling to the time of data transmission. Time $T_{45}$ between the time of notification and the start of transmission may be inferred from times $T_{35}$ and $T_{34}$.

The terminals to be scheduled for data transmission may be associated with different "scheduling" delays. In one embodiment, the scheduling delay is defined as the difference between the time a terminal is scheduled for data transmission and the time of actual data transmission to the terminal (i.e., time $T_{35}$ in FIG. 2). In another embodiment, the scheduling delay is defined as the difference between the time data is available for the terminal and the time of actual data transmission to the terminal (i.e., time $T_{15}$ in FIG. 2). The scheduling delay may also be defined in some other manner, and this is within the scope of the invention.

The different scheduling delays among the terminals may arise due to various factors. First, some terminals may be in soft handoff with multiple base stations while other terminals may be in communication with a single base station. For a terminal in soft handoff, additional time may be required to collect and report the pertinent information required to schedule the terminal and to coordinate the data transmission to the terminal by the multiple base stations. This additional time may then result in a longer scheduling delay for the terminal in soft handoff. Second, terminals moving into a neighboring coverage area or network that is not controlled by the original BSC and/or MSC may also be associated with longer scheduling delays. For these terminals, additional delays may be encountered in routing the pertinent information through the new BSC and/or MSC. Third, terminals supported by base stations with different backhaul delays may also be associated with different scheduling delays. Other factors may also cause different scheduling delays among the terminals. These various operating scenarios are described in further detail below.

A terminal in soft handoff may be associated with a longer "reporting" delay and a longer scheduling delay than those of a terminal not in soft handoff. The longer reporting delay may result from the need to forward the pertinent information from all base stations supporting the terminal to the entity or entities that need the information for scheduling. Moreover, if the terminal's communication with one base station in soft handoff is broken, then longer reporting delays may be incurred if the information from this base station needs to be routed through the system controller.

The longer scheduling delay for the terminal in soft handoff may result from the need to coordinate the data transmissions from multiple base stations to the terminal. Different base stations may have different "loading", which refers to various factors related to data transmission to the terminals under the base station's coverage area. One such factor may relate to the amount of transmit power needed to satisfy the forward link demands of the terminals (i.e., their bits in the base station's transmit buffer). Another factor may relate to the amount of channelization (e.g., Walsh) code space needed to satisfy the terminal demands.

Each base station's loading typically varies over time. To schedule a terminal not in soft handoff, the loading of only one base station needs to be considered, which then simplifies the scheduling for this terminal. In contrast, to schedule a terminal in soft handoff, the loading of all affected base stations needs to be considered, which tends to complicate the scheduling for this terminal. For soft handoff, coordination is required among the multiple base stations supporting the terminal in soft handoff, so that the data transmissions from these multiple base stations to the terminal occur at approximately the same time. This would then allow the soft-handoff terminal to "soft combine" the symbols received from the multiple base stations prior to decoding, which improves performance The longer scheduling delay for soft handoff may also result from a longer notification delay. The schedule for the terminal in soft handoff needs to be sent to all affected base stations, and a notification may need to be sent from each of these base stations to the terminal.

The additional complexity and delays associated with scheduling a terminal in soft handoff may be illustrated with reference to FIG. 1. As an example, base station 104a may be designated to schedule data transmission for terminals 106a and 106b, with terminal 106b being in soft handoff with base stations 104a and 104b, and terminal 106b being in soft handoff with base stations 104a, 104b, and 104c. To schedule terminal 106a, base station 104a may need from base station 104b (1) information regarding the link efficiency of terminal 106a with respect to base station 104b, (2) the loading at base station 104b, and so on. Similarly, to schedule terminal 106b, base station 104a may need from each of base stations 104b and 104c (1) information regarding the link efficiency of terminal 106b with respect to each of these base stations, (2) the loading at base stations 104b and 104c, and so on. In contrast, base station 104a is able to schedule terminal 106c for data transmission without any additional information from these other base stations.

For a wireless communication system, the terminals may also experience different scheduling delays based on their locations in the system. A terminal located within the coverage area of one base station may be scheduled for data transmission by that base station, and may thus be associated with the shortest possible scheduling delay. A terminal located between the coverage areas of two or more base stations (i.e., in soft handoff) may be scheduled by (or have its pertinent information directed through) a BSC that provides coordination and control for that group of base stations. A longer scheduling delay may then result from having to route the pertinent information and schedule through the BSC. A terminal located between the coverage areas of two or more BSCs may be scheduled by (or have its pertinent information directed through) an MSC that provides coordination and control for that group of BSCs. Additional scheduling delay may then result from having to route the pertinent information and schedule through the BSC and MSC. And a terminal located between the coverage areas of two or more MSCs may be scheduled by (or have its pertinent information directed through) a network entity that provides coordination and control for that group of MSCs, which would additionally increase delay. Thus, the scheduling delay of a given terminal may increase with increasing number of network elements needed to route information and/or schedule for the terminal.

The scheduling of terminals for data transmission may be performed using various types of scheme, such as a distributed scheduling scheme, a centralized scheduling scheme, and a hybrid scheduling scheme. Other types of scheduling schemes may also be used, and this is within the scope of the invention.

For a distributed scheduling scheme, each base station includes a separate scheduler that schedules the terminals within its coverage area for data transmission. For this scheme, coordination is required between the multiple base stations supporting each terminal in soft handoff, so that the data transmissions from these multiple base stations to the terminal occur at approximately the same time so that the received symbols from these base stations may be soft combined prior to decoding.

For a centralized scheduling scheme, a master scheduler schedules the terminals within the coverage areas of multiple base stations for data transmission. This master scheduler may be located in system controller 102 (e.g., a BSC or MSC), one of the base stations 104, or some other network element. For this scheme, all pertinent information needed to schedule the terminals is provided to the master scheduler, which then schedules the terminals and provides a schedule for each base station.

For a hybrid scheduling scheme, a master scheduler schedules the terminals for a group of base stations, and a separate scheduler may also be used for each base station. For example, the master scheduler may be designated to schedule all terminals in soft handoff, and the separate scheduler at each base station may be designated to schedule terminals that are not in soft handoff.

For all scheduling schemes, a scheduler may require various types of information to effectively perform the scheduling. The information required for each base station may include, for example, the loading at the base station, the total transmit power, $P_{sched}$, available for use for data transmission to the scheduled terminals, the link efficiency of each terminal to be scheduled, the amount of data to be transmitted to each terminal, and so on. Some of the information may be provided by the base station or some other network entity, and some of the information may be provided by the terminals to be scheduled. The information typically changes over time and the scheduling may be performed in a manner to account for the changes.

Each terminal to be scheduled may provide feedback information to all base stations with which it is in communication. This feedback information may then be used to schedule data transmission to the terminal. The feedback information may be indicative of, for example, the signal quality of the received signal at the terminal, the maximum data rate that the terminal can support, acknowledgment (ACK) and/or negative acknowledgment (NACK) for prior transmitted packets, other information, or any combination thereof. The received signal quality may be quantified, for example, by an energy-per-bit-to-total-noise-and-interference ratio ($E_b/I_o$) of the traffic channel dedicated to the terminal, or an energy-per-pilot-chip-to-total-received-power-density-ratio ($E_{cp}/I_o$) of the pilot channel, or both. The maximum supportable data rate may be determined by estimating the $E_b/I_o$ of the pilots transmitted by the base stations, or some other techniques.

For a distributed scheduling scheme, each base station receives the feedback information from the terminals as well as other pertinent information from other base stations for the terminals (including those in soft handoff). Each base station then schedules data transmission for the terminals within its coverage area based on the received information. For a centralized scheduling scheme, each base station may forward the feedback information and other pertinent information to the master scheduler, which then uses the information to schedule data transmission to the terminals.

The scheduling of data transmission to the terminals may be made based on various factors. Some of these factors are described below. Other factors may also be considered, and this is within the scope of the invention.

Link efficiency. Link efficiency is indicative of the amount of transmit power required to transmit data to a given terminal, and may be given in units of Watts per bit per second (Watts/bps). Each terminal requires a particular $E_b/I_o$ for its received signal in order to achieve a particular target level of performance. This target $E_b/I_o$ is often referred to as the setpoint, and the target level of performance may be quantified by a particular frame error rate (FER) or packet error rate (PER). Each terminal is also associated with a particular propagation path loss, and would require a particular amount of transmit power per bps (which is denoted as $P_b$) to achieve the target $E_b/I_o$.

The link efficiency of a given terminal may be determined as the total transmit power per bps, $P_b$, expected to be required for reliable data transmission. For a terminal in communication with a single base station, $P_b$ is the amount of transmit power required from this single base station for reliable data transmission. And for a terminal in soft handoff with multiple base stations, $P_b$ is the sum of the transmit powers per bps required from the individual, base stations supporting the terminal in soft handoff, and may be expressed as:

$$P_b = \sum_{i=1}^{N_B} P_b^i, \qquad \text{Eq (1)}$$

where $P_b^i$ is the transmit power per bps required from base station i, and $N_B$ is the number of base stations with which the terminal is in soft handoff.

The link efficiency of a given terminal may be determined by various means. In one embodiment, the link efficiency is determined based on power control bits transmitted on the forward link to the terminals. In many CDMA systems, the transmit power of each terminal is controlled by a reverse power control mechanism such that the setpoint is achieved at the base station while minimizing the amount of interference to other terminals. The forward link power control bits are used to implement the reverse power control mechanism, and are transmitted at a power level estimated to provide reliable detection at the terminal. The determination of the link efficiency based on power control bits is described in further detail in U.S. patent application Ser. No. 09/239,451, entitled "Method and Apparatus for Controlling Transmission Power in a CDMA Communication System," filed Jan. 28, 1999, assigned to the assignee of the present application and incorporated herein by reference. The link efficiency may also be determined based on traffic data transmitted to the terminals.

Quality of Service (QOS). Quality of service is related to the level of service enjoyed by a given terminal. QOS may be quantified by various parameters such as (1) the total delay experienced by the terminal for a data transmission, (2) the average or raw throughput achieved for the terminal, (3) the actual frame error rate for the data transmission, and so on.

Other Factors. Other factors may also be considered in scheduling terminals for data transmission. One such factor may relate to the type of service being provided to the terminals. Different types of service may be associated with different revenues or profits, and terminals associated with higher profits/revenues may be considered first before terminals associated with lower profits/revenues. Another factor may relate to the type of data to be transmitted to the terminals. Delay sensitive data may be given higher priority in scheduling, and delay insensitive data may be given lower priority. Retransmitted data due to decoding errors in a prior transmission may also be given higher priority since other processes may be waiting for the retransmitted data at the terminal. Other factors may also be considered, and this is within the scope of the invention.

Any combination of the factors described above may be considered in scheduling terminals for data transmission. For example, each factor may be weighted with a respective weight, and the weighted values for all factors may be combined to provide a score for each terminal. The scores may then be used to prioritize the terminals, and the scheduling may be performed based on the priorities of the terminals.

In one specific implementation, the score $\phi_i(n)$ for terminal i at frame n is indicative of the linear average throughput achieved over $N_P$ prior frames, and may be expressed as:

$$\phi_i(n) = \left(\frac{1}{N_P}\right) \sum_{l=n-N_P+1}^{n} \left(\frac{r_i(l)}{r_{max}}\right), \quad \text{Eq (2)}$$

where $r_i(n)$ is the "realized" data rate (in unit of bits/frame) for terminal i at frame n. Typically, $r_i(n)$ is bound by a particular maximum achievable data rate, $r_{max}$, and a particular minimum data rate (e.g., zero).

In another specific implementation, the score $\phi_i(n)$ for terminal i at frame n is indicative of the exponential average throughput achieved over a particular time interval, and may be expressed as:

$$\phi_i(n) = (1-\alpha) \cdot \phi_i(n-1) + \alpha \cdot r_i(n)/r_{max}, \quad \text{Eq (3)}$$

where $\alpha$ is a time constant for the exponential averaging, with a larger value for $\alpha$ corresponding to a shorter averaging time interval.

In yet another specific implementation, the score $\phi_i(n)$ for terminal i at frame n is indicative of a normalized data rate, and may be expressed as:

$$\phi_i(n) = \frac{r_i(n)}{[Tp_i(n)]^K}, \quad \text{Eq (4)}$$

where $Tp_i(n)$ is the average or recent throughput for terminal i at frame n, and K is a weighting factor.

For the scores computed using equations (2) and (3), a higher priority may be given to a terminal with a lower score, which corresponds to a lower average throughput. And for the scores computed using equation (4), a higher priority may be given to a terminal with a higher score, which corresponds to a lower average or recent throughput.

If the scheduling delays are the same for all terminals to be scheduled for data transmission, then the terminals may be scheduled based on any combination of the various factors described above. At each frame, the pertinent information needed to schedule the terminals is received by the scheduler. The scores and/or priorities of the terminals may then be determined, and the terminals may be scheduled based on their scores and/or priorities. A notification is then sent to each scheduled terminal, as shown in FIG. 2. The data transmission to these scheduled terminals thereafter occurs at the designated times.

The scheduling of terminals for data transmission is described in further detail in U.S. patent application Ser. No. 09/528,235, entitled "Forward-Link Scheduling in a Wireless Communication System," filed Mar. 17, 2000, and U.S. Pat. No. 6,335,922, entitled "Method and Apparatus for Forward Link Scheduling," issued Jan. 1, 2002, both assigned to the assignee of the present invention and incorporated herein by reference.

If the scheduling delays are not the same for all terminals to be scheduled for data transmission, then the terminals may be scheduled based on various scheduling schemes, some of which are described below.

In a first scheduling scheme for terminals with unequal scheduling delays, the terminals are scheduled based on the longest scheduling delay among the delays of all terminals to be scheduled. At each frame, the scheduler receives complete information for the terminals ready to be scheduled for data transmission. As described above, different terminals may be associated with different reporting delays. In that case, each terminal may be considered for scheduling whenever the pertinent information is received by the scheduler for the terminal.

Figure 3:
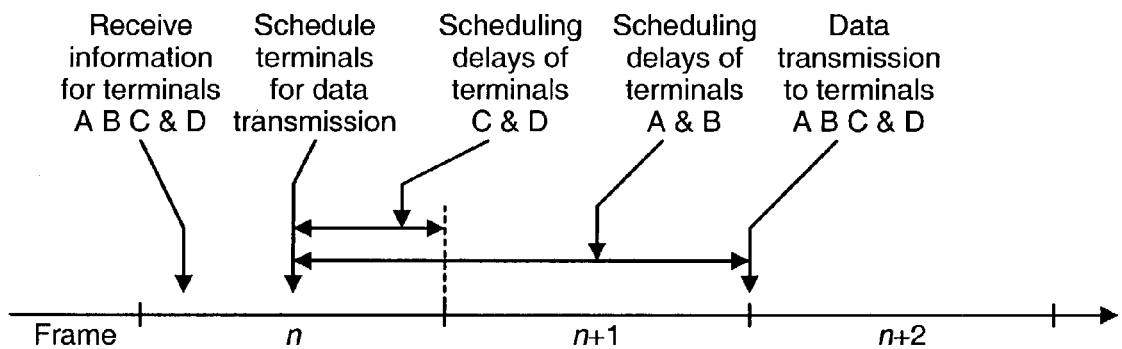
FIG. 3 is a diagram illustrating the first scheduling scheme whereby terminals are scheduled for data transmission based on the longest scheduling delay.

FIG. 3 is a diagram illustrating the scheduling of terminals for data transmission based on the longest scheduling delay. In this example, four terminals A, B, C, and D are to be scheduled for data transmission. These terminals may correspond to terminals 106a, 106b, 106d, and 106e in FIG. 1. Terminals A and B are in soft handoff and are associated with longer scheduling delays, and terminals C and D are not in soft handoff and are associated with shorter scheduling delays. In this example, the pertinent information is received for terminals A, B, C, and D in frame n. In the same frame n, it is possible to schedule terminals C and D for data transmission in frame n+1 because of their shorter scheduling delays, but terminals A and B need to be scheduled for data transmission in frame n+2 because of their longer scheduling delays. However, for the first scheduling scheme, all four terminals A, B, C, and D are scheduled at frame n for data transmission in frame n+2, corresponding to the longest scheduling delay for all four terminals.

In general, the scheduler can determine the maximum scheduling delay, $D_{max}$, for all terminals to be scheduled. At frame n, the scheduler can then schedule these terminals for data transmission at frame $n+D_{max}$ using any one of the scheduling schemes that may be used for scheduling terminals with equal scheduling delays.

The scheduling of data transmission for a set of terminals is dependent on various factors such as (1) the total transmit power, $P_{sched}$, available for data transmission and (2) the link efficiency, $P_b$, of each terminal. At frame n, the scheduler may be provided with an estimate of the total transmit power, $\hat{P}_{sched}(n+D_{max})$, expected to be available at frame $n+D_{max}$ when the data transmission is to begin. The total available transmit power expected to be available at a future frame may be estimated (or predicted) based on information available at the time of scheduling. The scheduler is also provided with an estimate of the link efficiency, $\hat{P}_{b,i}(n-D_i)$, made at frame $n-D_i$ for each terminal to be scheduled. The link efficiency of each terminal is thus estimated $D_i$ frames prior to the current frame n, where $D_i$ can be zero or some other positive value depending on the reporting delay. The estimates of the total available transmit power, $\hat{P}_{sched}(n+D_{max})$, and the link efficiency, $\hat{P}_{b,i}(n-D_i)$, are more likely to be inaccurate with increasing delay between the time the estimates are made and the time they are used.

The total transmit power available for the scheduled terminals and the link efficiency of each terminal may be estimated (or predicted) at a particular moment in time (e.g., at the time the data transmissions are scheduled) for a particular future moment in time (e.g., the frame when data transmission is to commence). However, the link conditions may change between the time the estimates are made and the time the estimates are actually used. When the link changes, these estimates may not be accurate at the time they are actually used. If the total transmit power available for the scheduled terminals is much lower than estimated and/or the estimated link efficiency is too optimistic, then excessive frame errors may occur, which would then degrade performance. Alternatively, if the total available transmit power is much higher than estimated and/or the estimated link efficiency is too pessimistic, then valuable system resources may be underutilized.

For the first scheduling scheme, since the scheduling is based on the longest scheduling delay, a higher margin (e.g., a larger back-off) may be used in scheduling the terminals for data transmission to account for the higher likelihood of the estimates being inaccurate.

In a second scheduling scheme for terminals with unequal scheduling delays, the terminals are assigned priorities based on their scheduling delays and or some other factors (e.g., soft handoff). In each frame, the scheduler receives complete information for the terminals ready to be scheduled for data transmission in a particular future frame. These terminals may be associated with different scheduling delays. For the second scheme, the terminals with longer scheduling delays are assigned higher priorities, and the terminals with shorter scheduling delays are assigned lower priorities. The terminals are then scheduled for data transmission by taking into account their priorities. The terminals with the same scheduling delays may be scheduled based on the considerations described above for the scheduling of terminals with the same scheduling delays.

For the second scheduling scheme and using the example shown in FIG. 3, all four terminals A, B, C, and D are scheduled at frame n for data transmission in a future frame n+2. For the scheduling, terminals A and B are assigned higher priorities because they are in soft handoff and are associated with longer scheduling delays, and terminals C and D are assigned lower priorities because they are not in soft handoff. Thus, terminals A and B will be allocated a larger portion of the resources (e.g., transmit power and channelization code space) available in frame n+2. These terminals would then be notified of any data transmission scheduled for them on frame n+2. Because the priorities of terminals C and D are lower, by the time the scheduler considers these terminals for data transmission in frame n+2, part or all of the resources are likely to have already been allocated to terminals A and B. However, terminals C and D may still be allocated any remaining available resources.

Figure 4:
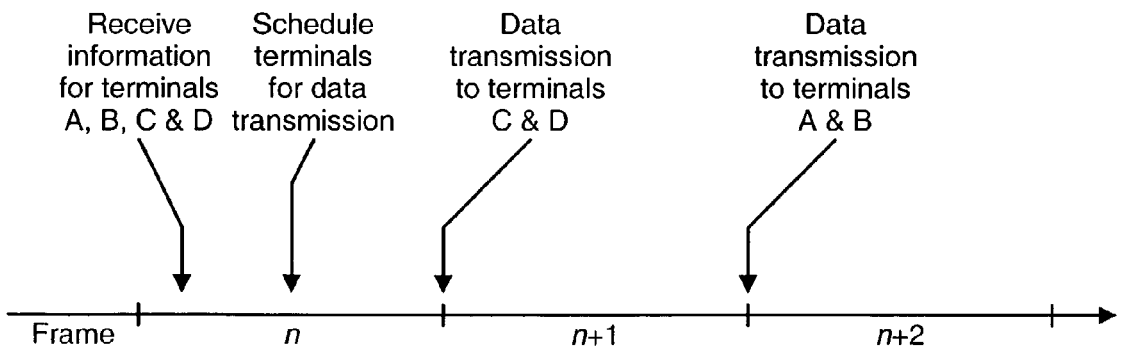
FIG. 4 is a diagram illustrating the second scheduling scheme whereby terminals are scheduled for data transmission based on their scheduling delays.

FIG. 4 is a diagram illustrating the scheduling of terminals for data transmission based on their scheduling delays. For the example shown in FIG. 4, the scheduler receives the pertinent information for terminals A, B, C, and D in frame n. Similar to the example for FIG. 3, terminals A and B are associated with longer scheduling delays and terminals C and D are associated with shorter scheduling delays. Terminals A and B may be scheduled for data transmission at frame n+2, and terminals C and D may be scheduled for data transmission at frame n+1. Because of their longer scheduling delays, terminals A and B may be given higher priority when scheduling data transmission for frame n+2. And because of their shorter scheduling delays, terminals C and D may be given lower priority when scheduling data transmission for frame n+1. In fact, some of the total transmit power, $\hat{P}_{sched}(n+1)$, expected to be available at frame n+1 may have already been allocated to terminals with longer scheduling delays by the scheduler when it performs scheduling at the prior frame n−1.

In general, the second scheduling scheme schedules terminals with longer scheduling delays ahead of terminals with shorter scheduling delays. However, a terminal with a shorter scheduling delay may be assigned a higher priority than one with a longer scheduling delay due to some other considerations (e.g., higher profits). The second scheduling scheme attempts to schedule as many terminals as possible for data transmission at the earliest possible time, subject to certain exceptions, which may improve system performance.

In a third scheduling scheme for terminals with unequal scheduling delays, a particular percentage of the available system capacity is allocated to each class of terminals having the same scheduling delays. The system capacity may be quantified in terms of the total transmit power, $P_{sched}$, available for scheduled terminals. The specific percentage of the system capacity to be allocated to each class of terminals may be determined based on various factors.

In one embodiment, the percentage of the available system capacity to be allocated to each class is determined based on (e.g., proportional to) the link efficiencies of the terminals in the class. The link efficiencies may further be weighted based on various factors such as, for example, the transmission capacity of the base station (Wattage), the total amount of data to be transmitted to the terminals in each class, the throughput of the terminals, the profit associated with each data bit to be transmitted to the scheduled terminals, and so on. In another embodiment, the available system capacity is allocated to the classes based on any combination of factors, such as those listed above. The system capacity allocation may be performed independently by (and for) each base station in a distributed scheduling scheme, or may be performed by the master scheduler for a centralized scheduling scheme.

Figure 5:
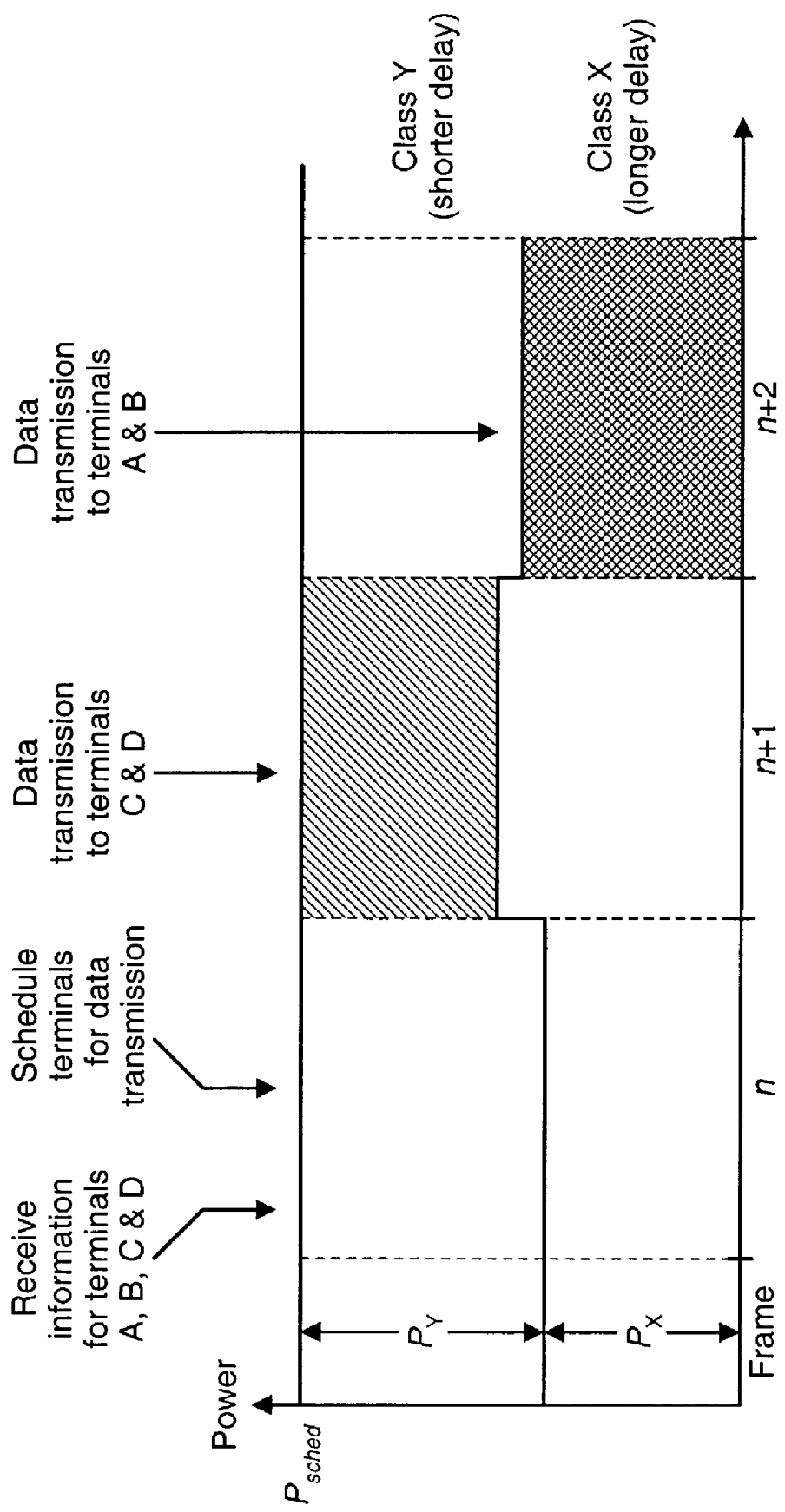
FIG. 5 is a diagram illustrating the third scheduling scheme whereby the total available transmit power is allocated to classes of terminals, and the terminals in each class are scheduled based on the transmit power allocated to that class.

FIG. 5 is a diagram illustrating the allocation of the total available transmit power to two different classes of terminals. In this example, class X includes terminals with longer scheduling delays (e.g., terminals A and B in the above example), and class Y includes terminals with shorter scheduling delays (e.g., terminals C and D in the above example). At each frame, the scheduler receives the pertinent information for the terminals to be scheduled in that frame. The scheduler then categorizes the terminals into the proper classes based on their scheduling delays. The scheduler may further determine other parameters required for scheduling the terminals, such as the percentage allocation of the total available transmit power to the classes. The scheduler then schedules the terminals in class X based on the transmit power, $P_X$, allocated to class X, and similarly schedules the terminals in class Y based on the transmit power, $P_Y$, allocated to class Y. The scheduling for each class of terminals may be performed in similar manner as that described above for terminals with equal scheduling delays.

As noted above, longer reporting and/or scheduling delays typically result in reduced accuracy in the estimated total available transmit power and link efficiencies. In one embodiment, different amounts of margin (i.e., different back-off amounts) may be used for different classes of terminals. In particular, a larger margin may be used for class X associated with a longer scheduling delay, and a smaller margin may be used for class Y associated with a shorter scheduling delay. In another embodiment, terminals with longer scheduling delays may be scheduled more conservatively than terminals with shorter scheduling delays. For example, terminals with longer scheduling delays may be started off at a lower data rate.

The transmit power allocated to each class may also be dynamically adjusted to account for changes in the operating conditions. For example, the percentage allocation may be adjusted based on the usage by each class, the changes in link efficiency, and so on.

The transmit power allocated to a given class may also be reallocated and used by another class in certain circumstances. In an embodiment, unused transmit power for a class associated with a longer scheduling delay may be used by another class associated with a shorter scheduling delay. For example, at frame n, the terminals in class X may be scheduled for data transmission in frame n+2. At frame n, if it is determined that the transmit power allocated to class X in frame n+1 (by the scheduler at frame n−1) will not be totally used up by the data transmission to the scheduled terminals in this class, then any remaining unused transmit power for class X for frame n+1 may be used for data transmission to the terminals in class Y. This is possible because the terminals in class Y have shorter scheduling delays and may be notified in time for data transmission in frame n+1.

In a fourth scheduling scheme for terminals with unequal scheduling delays, the terminals are initially scheduled for data transmission as if they have equal scheduling delays. The schedule for each terminal is then applied after its scheduling delay.

Figure 6:
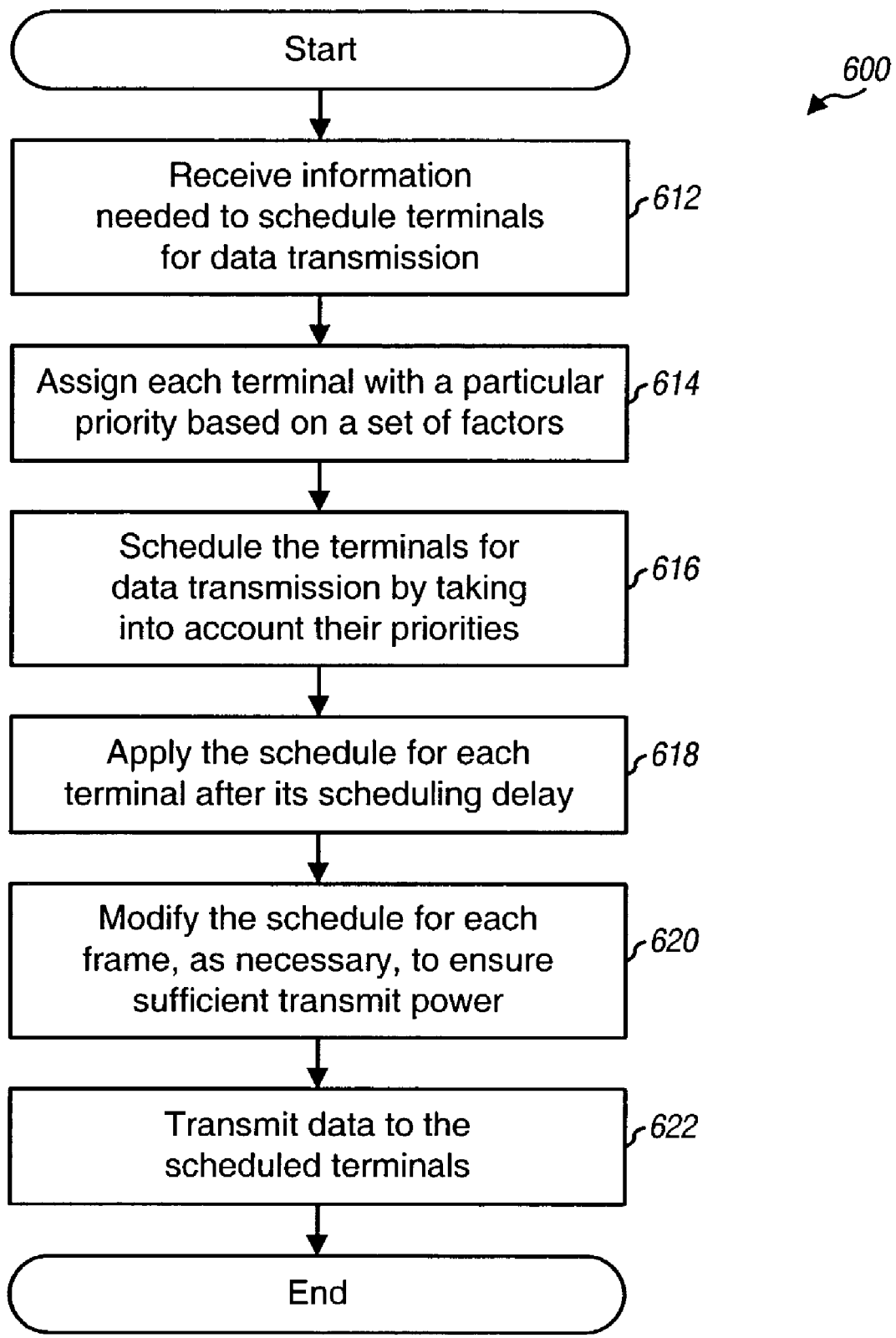
FIG. 6 is a flow diagram of an embodiment of a process for scheduling data transmission for terminals in accordance with the fourth scheduling scheme.

FIG. 6 is a flow diagram of an embodiment of a process 600 for scheduling data transmission for terminals in accordance with the fourth scheduling scheme. At each frame, the scheduler receives complete information for the terminals ready to be scheduled for data transmission (step 612). These terminals may be associated with different scheduling delays. For the fourth scheme, each terminal to be scheduled may be initially assigned a particular priority based on various factors such as link efficiency, throughput, profitability considerations, and so on, or any combination thereof (step 614). For example, a higher priority may be assigned to a terminal with higher link efficiency, a lower recent throughput, a higher profit, and so on.

The terminals are then scheduled for data transmission by taking into account their priorities (step 616). For this scheme, the terminals are scheduled with or without taking into account their scheduling delays, and may be scheduled for hypothetical data transmission at the next frame, or at the shortest scheduling delay among the delays of all terminals being scheduled, or at some other designated time. The total transmit power, $P_{sched}$, expected to be available at this hypothetical transmission time is used in scheduling the terminals.

The result of the scheduling is a schedule of the data transmission for each terminal (e.g., the data rate and transmit power to be used for the scheduled terminal). Thereafter, the individual schedule for each terminal is applied after its scheduling delay (step 618). Thus, the schedule for a terminal with a shorter scheduling delay applies before the schedule for a terminal with a longer scheduling delay.

Because the schedules of the individual terminals may be applied at different times due to different scheduling delays, for any given frame, the total available transmit power, $P_{sched}(n)$, for that frame may be insufficient to support all data transmissions that have been scheduled for that frame. If that occurs, then the schedule for the frame may be modified accordingly (step 620). For example, the total available transmit power for a given frame may first be allocated to terminals with longer scheduling delays (or higher priorities), and the remaining transmit power may then be allocated to terminals with shorter scheduling delays (or lower priorities). Terminals that are "bumped" from their scheduled frame may be considered for data transmission in the next frame (e.g., by raising their priorities). This flexibility to reschedule terminals with shorter scheduling delay in the following (or upcoming) frame may be possible because of their shorter notification time. For each frame, data is transmitted to each terminal scheduled to receive data transmission in that frame (step 622).

To reduce the likelihood of the terminals being bumped from their scheduled frames, a higher margin may be used when scheduling terminals with longer scheduling delays. For example, the expected link efficiencies of terminals with longer scheduling delays may be increased by a larger margin than that used for terminals with shorter scheduling delays.

The techniques described herein may be used to schedule terminals having different scheduling delays due to various factors. Moreover, the scheduling delay may be defined in various ways, as described above.

Figure 7:
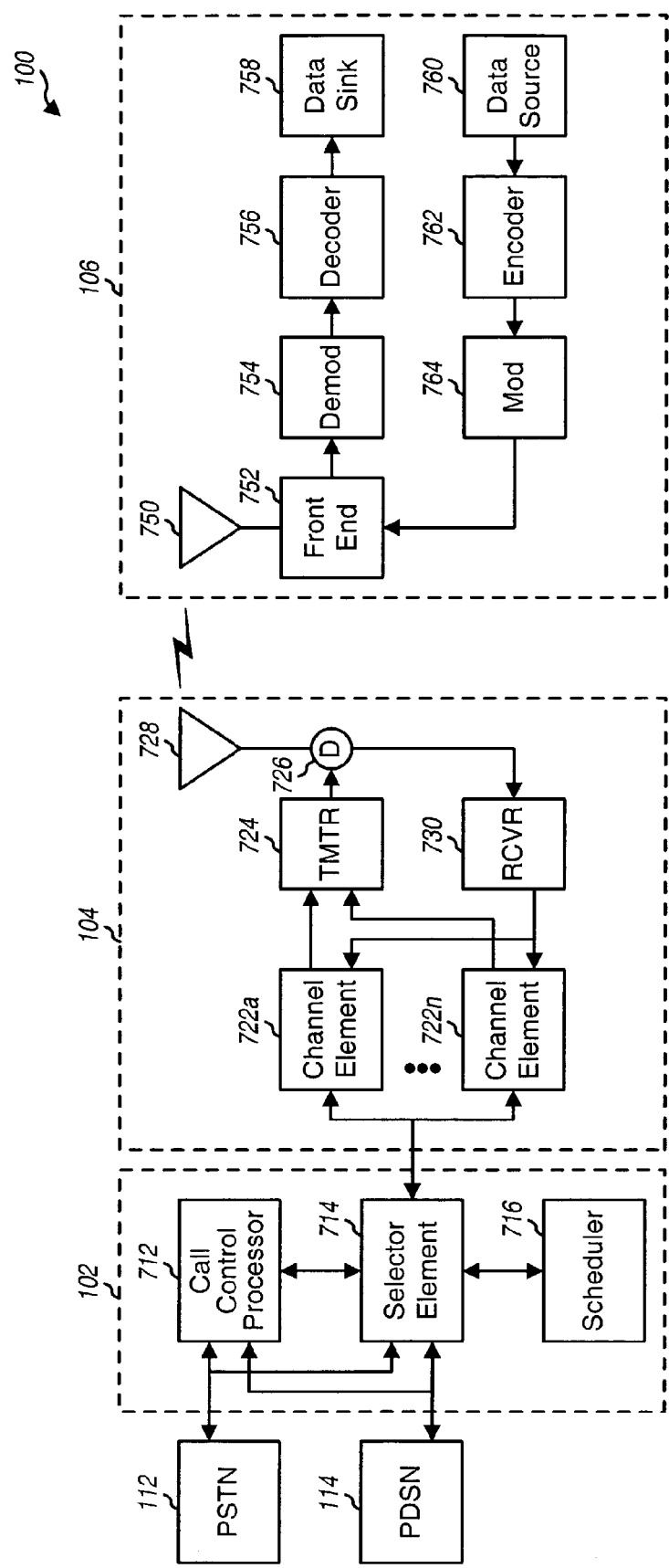
FIG. 7 is a block diagram of a specific embodiment of the network elements shown in FIG. 1.

FIG. 7 is a block diagram of a specific embodiment of various network elements in communication system 100. System 100 includes system controller 102 that communicates with a number of base stations 104 (only one base station is shown in FIG. 7 for simplicity). System controller 102 further interfaces with a public switch telephone network (PSTN) 112 (e.g., for voice services) and a packet data serving node (PDSN) 114 (e.g., for packet data services). System controller 102 coordinates the communication between the terminals in the wireless communication system and base station 104, PSTN 112, and PDSN 114.

In the embodiment shown in FIG. 7, system controller 102 includes a call control processor 712, a number of selector elements 714 (only one selector element is shown in FIG. 7 for simplicity), and a scheduler 716. Call control processor 712 controls the processing of a call for each terminal. One selector element 714 is assigned to control the communication between each terminal and one or more base stations. Scheduler 716 couples to all selector elements 714 within system controller 102 and schedules data transmissions for packet data users.

In the example design shown in FIG. 7, base station 104 includes a number of channel elements 722a through 722n. One channel element 722 is assigned to process the communication for each terminal and couples to the associated selector element 714 also assigned to the terminal. Each selector element 714 receives from scheduler 716 the schedule for the assigned terminal (e.g., the data rate, transmit power, and transmit time) and forwards the schedule to the associated channel element 722. Channel element 722 receives, encodes, and modulates data for the assigned terminal based on the received schedule. The modulated signal is unconverted and conditioned by a transmitter (TMTR) 724, routed through a duplexer 726, and transmitted via an antenna 728 over the forward link.

At the recipient terminal 106, the forward link signal is received by an antenna 750 and routed to a front-end unit 752. Front-end unit 752 filters, amplifies, downconverts, and digitizes the received signal to provide data samples. The data samples are then demodulated by a demodulator (Demo) 754, decoded by a decoder 756, and provided to a data sink 758. The demodulation and decoding are performed in a complementary manner to the modulation and encoding performed at the base station.

Data transmission on the reverse link occurs in a similar manner. Data is provided from a data source 760 within terminal 106, encoded by an encoder 762, and modulated by a modulator (Mod) 764 to provide a modulated signal. The modulated signal is then upconverted and conditioned by front-end unit 752 and transmitted via antenna 750.

At base station 104, the reverse link signal is received by antenna 728, routed through duplexer 726, and provided to a receiver (RCVR) 730. Receiver 730 filters, amplifies, downconverts, and digitizes the reverse link signal and provides data samples to the channel element 722 assigned to the terminal. The assigned channel element 722 demodulates and decodes the data samples in a manner complementary to the modulation and encoding performed at the terminal. The decoded data may be provided to the selector element 714 assigned to the terminal, which may further forward the data to another base station 104, PSTN 112, or PDSN 114. The design, as described above, supports transmission for both data and voice services over the system. Other designs may also be contemplated and are within the scope of the invention.

The processing (e.g., encoding and modulation) for the forward and reverse links is defined by the particular CDMA standard or system being implemented (e.g., IS-95, cdma2000, IS-856, or W-CDMA). These standards are known in the art and not described herein.

Figure 8:
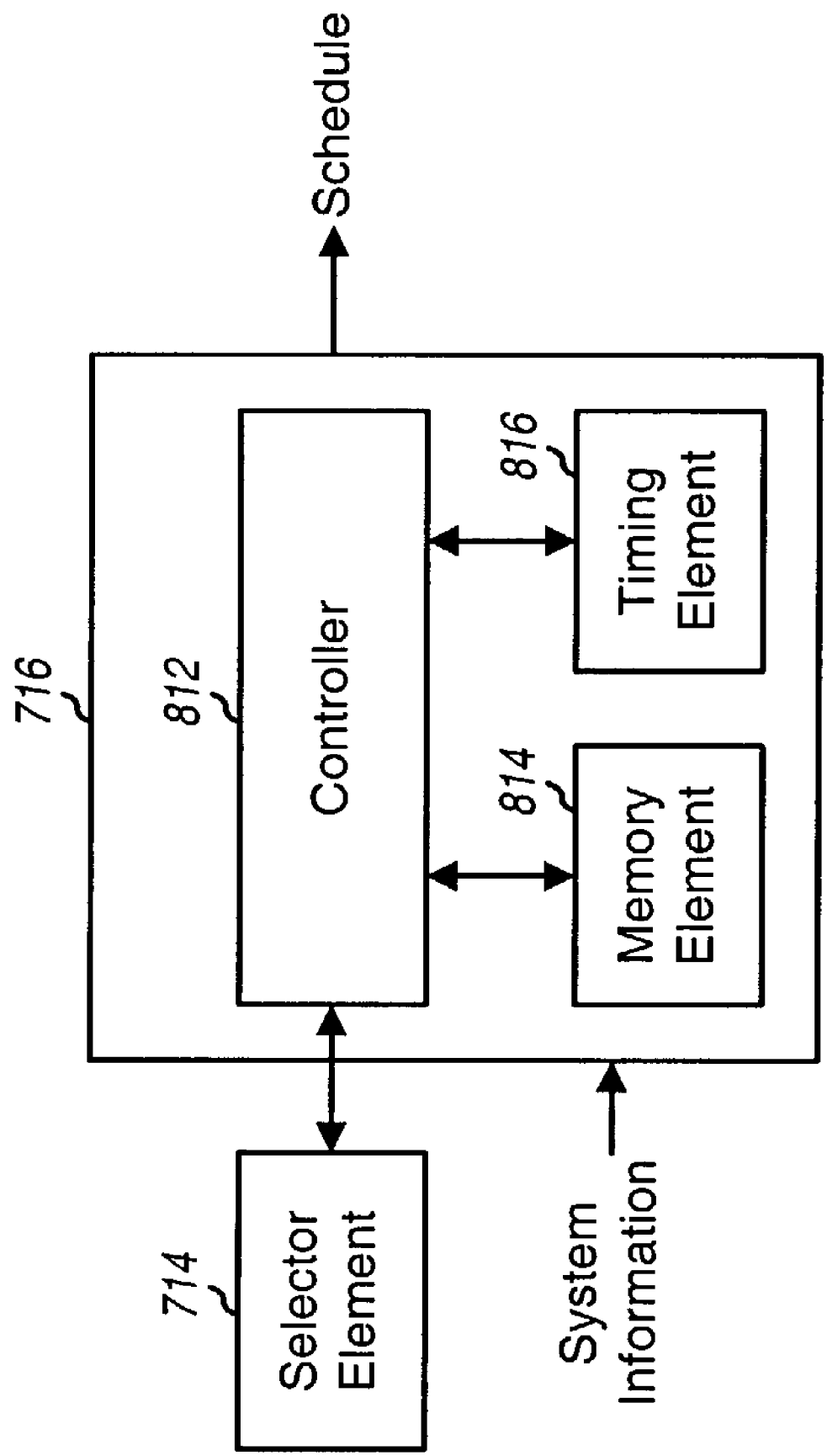
FIG. 8 is a block diagram of an embodiment of a scheduler.

FIG. 8 is a block diagram of an embodiment of scheduler 716. In this embodiment, scheduler 716 includes a controller 812 that couples to a memory unit 814 and a timing unit 816. Controller 812 further couples to selector elements 714 within system controller 102 and receives the pertinent information from the base stations (e.g., the link efficiency, $P_b$, of the terminals, the data rates for the unscheduled terminals, the amount of data to be transmitted to each scheduled terminal, and so on). Controller 812 may use the received information to estimate the total transmit power, $P_{sched}$, available for the scheduled terminals. Controller 812 would then schedule data transmissions for the terminals based on the estimated total available transmit power, $P_{sched}$, and using any one or a combination of the scheduling schemes described above. The result of the scheduling is an individual schedule for each terminal scheduled for data transmission. The schedule for each terminal may include, for example, the scheduled data rate, the allocated transmit power, the transmission start time and duration, and so on.

Memory unit 814 may be used to store various types of information required and/or provided by controller 812, such as the pertinent information received from the base stations, the schedules, and so on. Timing unit 816 provides controller 812 with timing signals used to perform the scheduling. The timing signals also allow controller 812 to send the schedule to selector elements 714 at the appropriate time. Memory unit 814 may be implemented using RAM, DRAM, Flash RAM, other types of memories, or a combination thereof. Timing unit 816 may be implemented with a counter running off a system clock, an on-board oscillator locked to an external signal, a storage element for receiving system timing from an external source, or some other design.

The scheduling described above may be achieved by various designs. The location of the scheduler is dependent on whether a centralized, distributed, or hybrid scheduling scheme is desired. For example, a scheduler may be located within each base station and used to schedule the terminals within the base station's coverage area. This distributed scheduling may reduce the processing delay for some terminals. Alternatively, a master scheduler may be designed to schedule data transmission for a group of base stations. This centralized scheduling may result in a more efficient use of the system resources.

In any case, the scheduler is tasked with the function of assigning the data rate to each scheduled terminal such that a set of goals is optimized. These goals may include (1) improved utilization of the system capacity by transmitting as much scheduled and unscheduled tasks as can be supported within system capacity constraints, (2) improved communication quality and minimized transmission delay, and (3) fair allocation of the system capacity to the scheduled terminals based on a set of priorities. The goals are optimized by balancing a list of factors.

The scheduling of data transmissions on the forward link is also described in further detail in the aforementioned U.S. patent application Ser. No. 09/528,235 and U.S. Pat. No. 6,335,922.

The scheduling techniques described herein may be implemented by various means. For example, these techniques may be implemented in hardware, software, or a combination thereof. For a hardware implementation, the scheduler and other elements used to implement any one or a combination of the scheduling techniques described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the scheduling techniques may be implemented with modules (e.g., procedures, functions, and so on) that perform the functions described herein. The software codes may be stored in a memory unit (e.g., memory unit 814 in FIG. 8) and executed by a processor (e.g., controller 812). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of scheduling data transmission in a wireless communication system, comprising:

determining a scheduling delay of each of a plurality of terminals to be scheduled for data transmission;

categorizing the plurality of terminals into a plurality of classes based on their scheduling delays;

allocating a particular percentage of total system capacity to each class; and scheduling one or more terminals in each class for data transmission based on the system capacity allocated to the class and in accordance with a particular scheduling scheme.

2. The method of claim 1, wherein the total system capacity is quantified by total transmit power available for data transmission.

3. The method of claim 1, wherein each class includes one or more terminals having approximately equal scheduling delays.

4. The method of claim 1, wherein the percentage of total system capacity allocated to each class is determined based on link efficiencies of the terminals.

5. The method of claim 1, wherein the percentage of total system capacity allocated to each class is determined based on an amount of data to be transmitted to the plurality of terminals.

6. The method of claim 1, wherein data is transmitted to the one or more terminals in each class at a transmission interval determined based on the scheduling delay associated with the class.

7. The method of claim 1, wherein a higher margin is used in scheduling terminals with longer scheduling delays.

8. The method of claim 1, further comprising:
determining transmit power remaining from a first class associated with a longer scheduling delay; and scheduling one or more terminals in a second class associated with a shorter scheduling delay with the transmit power remaining from the first class.

9. The method of claim 1, wherein the particular scheduling scheme schedules the one or more terminals in each class for data transmission based on link efficiencies of the terminals.

10. The method of claim 1, wherein the particular scheduling scheme schedules the one or more terminals in each class for data transmission based on priorities of the terminals.

11. The method of claim 1, wherein the particular scheduling scheme schedules the one or more terminals in each class for data transmission based on a set of parameters.

12. The method of claim 1, wherein the plurality of terminals includes terminals in soft handoff and terminals not in soft handoff.

13. The method of claim 1, wherein an unused portion of a particular percentage of total system capacity allocated to a particular class is reallocated to a different class.

14. A memory communicatively coupled to a digital signal processing device (DSPD) capable of interpreting digital information to:

determine a scheduling delay of each of a plurality of terminals to be scheduled for data transmission;

categorize the plurality of terminals into a plurality of classes based on their scheduling delays;

allocate a particular percentage of total system capacity to each class; and schedule one or more terminals in each class for data transmission based on the system capacity allocated to the class and in accordance with a particular scheduling scheme.

15. A computer program product for scheduling data transmission in a wireless communication system, comprising:

code for determining a scheduling delay of each of a plurality of terminals to be scheduled for data transmission;

code for categorizing the plurality of terminals into a plurality of classes based on their scheduling delays;

code for allocating a particular percentage of total system capacity to each class;

code for scheduling one or more terminals in each class for data transmission based on the system capacity allocated to the class and in accordance with a particular scheduling scheme; and a computer-usable medium for storing the codes.

16. A scheduler in a wireless communication system, comprising:

a memory unit operative to store data used for scheduling data transmission; and a controller coupled to the memory unit and operative to
determine a scheduling delay of each of a plurality of terminals to be scheduled for data transmission, categorize the plurality of terminals into a plurality of classes based on their scheduling delays, allocate a particular percentage of total system capacity to each class, and schedule one or more terminals in each class for data transmission based on the system capacity allocated to the class and in accordance with a particular scheduling scheme.

17. The scheduler of claim 16, wherein each class includes one or more terminals having approximately equal scheduling delays.

18. A base station comprising the scheduler of claim 16.

19. An apparatus for scheduling data transmission in a wireless communication system, comprising:

means for determining a scheduling delay of each of a plurality of terminals to be scheduled for data transmission;

means for categorizing the plurality of terminals into a plurality of classes based on their scheduling delays;

means for allocating a particular percentage of total system capacity to each class; and means for scheduling one or more terminals in each class for data transmission based on the system capacity allocated to the class and in accordance with a particular scheduling scheme.

20. A method of scheduling data transmission in a wireless communication system, comprising:

determining a scheduling delay of each of a plurality of terminals to be scheduled for data transmission;

scheduling the plurality of terminals for data transmission in accordance with a particular scheduling scheme to provide a schedule for each terminal; and applying the schedule for each terminal at a transmission interval determined based on its scheduling delay.

21. The method of claim 20, wherein a higher margin is used in scheduling a terminal with a longer scheduling delay.

22. The method of claim 20, wherein higher priorities are assigned to terminals with longer scheduling delays, and wherein the scheduling is performed based in part on the priorities of the terminals.

23. The method of claim 20, further comprising:
estimating link efficiency of each terminal, and wherein the plurality of terminals are further scheduled based on the estimated link efficiencies of the terminals.

24. The method of claim 20, further comprising:
determining total transmit power available for data transmission in a current transmission interval;

evaluating one or more schedules for one or more terminals scheduled for data transmission in the current transmission interval; and modifying at least one schedule based on the total available transmit power.

25. The method of claim 24, wherein a terminal with a shorter scheduling delay is removed from data transmission if the total available transmit power is insufficient to support all terminals scheduled for data transmission in the current transmission interval.

26. A scheduler in a wireless communication system, comprising:
a memory unit operative to store data used for scheduling data transmission; and
a controller coupled to the memory unit and operative to
determine a scheduling delay of each of a plurality of terminals to be scheduled for data transmission,
schedule the plurality of terminals for data transmission in accordance with a particular scheduling scheme to provide a schedule for each terminal, and
apply the schedule for each terminal at a transmission interval determined based on its scheduling delay.

27. The scheduler of claim 26, wherein a higher margin is used in scheduling a terminal with a longer scheduling delay.

28. A method of scheduling data transmission in a wireless communication system, comprising:
determining a scheduling delay of each of a plurality of terminals to be scheduled for data transmission;
assigning each terminal with a particular priority determined based on its scheduling delay; and
scheduling the plurality of terminals for data transmission based on the assigned priorities and in accordance with a particular scheduling scheme.

29. The method of claim 28, wherein terminals with longer scheduling delays are assigned higher priority than terminals with shorter scheduling delays.

30. The method of claim 28, wherein a higher margin is used in scheduling a terminal with a longer scheduling delay.

31. A scheduler in a wireless communication system, comprising:
a memory unit operative to store data used for scheduling data transmission; and
a controller coupled to the memory unit and operative to
determine a scheduling delay of each of a plurality of terminals to be scheduled for data transmission,
assign each terminal with a particular priority determined based on its scheduling delay, and
schedule the plurality of terminals for data transmission based on the assigned priorities and in accordance with a particular scheduling scheme.

32. The scheduler of claim 31, wherein terminals with longer scheduling delays are assigned higher priority than terminals with shorter scheduling delays.

33. A method of scheduling data transmission in a wireless communication systems, comprising:
determining a scheduling delay of each of a plurality of terminals to be scheduled for data transmission; and
scheduling the plurality of terminals for data transmission based on a longest scheduling delay among the scheduling delays of the plurality of terminals and in accordance with a particular scheduling scheme.

34. The method of claim 33, further comprising:
estimating total transmit power available for data transmission to the plurality of terminals; and
estimating link efficiency of each terminal, and
wherein the plurality of terminals are further scheduled based on the estimated total available transmit power and the estimated link efficiencies of the terminals.

35. The method of claim 33, wherein a higher margin is used in scheduling the plurality of terminals for data transmission due to use of the longest scheduling delay.

36. A scheduler in a wireless communication system, comprising:
a memory unit operative to store data used for scheduling data transmission; and
a controller coupled to the memory unit and operative to
determine a scheduling delay of each of a plurality of terminals to be scheduled for data transmission, and
schedule the plurality of terminals for data transmission based on a longest scheduling delay among the scheduling delays of the plurality of terminals and in accordance with a particular scheduling scheme.

37. The scheduler of claim 36, wherein a higher margin is used in scheduling the plurality of terminals for data transmission due to use of the longest scheduling delay.

* * * * *